United States Patent
Kim et al.

(10) Patent No.: US 10,588,039 B2
(45) Date of Patent: Mar. 10, 2020

(54) METHOD FOR REPORTING CHANNEL STATE IN WIRELESS COMMUNICATION SYSTEM, AND APPARATUS THEREFOR

(71) Applicant: LG ELECTRONICS INC., Seoul (KR)

(72) Inventors: Kijun Kim, Seoul (KR); Joonkui Ahn, Seoul (KR); Hanbyul Seo, Seoul (KR); Seungmin Lee, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 110 days.

(21) Appl. No.: 15/533,298

(22) PCT Filed: Dec. 23, 2015

(86) PCT No.: PCT/KR2015/014193
§ 371 (c)(1),
(2) Date: Jun. 5, 2017

(87) PCT Pub. No.: WO2016/108505
PCT Pub. Date: Jul. 7, 2016

(65) Prior Publication Data
US 2017/0366997 A1    Dec. 21, 2017

Related U.S. Application Data

(60) Provisional application No. 62/099,205, filed on Jan. 2, 2015.

(51) Int. Cl.
*H04W 4/00* (2018.01)
*H04W 24/10* (2009.01)

(52) U.S. Cl.
CPC .................... *H04W 24/10* (2013.01)

(58) Field of Classification Search
CPC ......... H04L 5/0048; H04L 1/00; H04L 25/02; H04L 5/001; H04L 5/0094; H04L 5/0023;
(Continued)

(56) References Cited

U.S. PATENT DOCUMENTS

| 9,240,864 B2 * | 1/2016 | Luo | ................ H04L 1/0054 |
| 9,867,070 B2 * | 1/2018 | Luo | ................ H04W 24/08 |

(Continued)

OTHER PUBLICATIONS

PCT International Application No. PCT/KR2015/014193, Written Opinion of the International Searching Authority dated Jul. 4, 2016, 22 pages.
(Continued)

*Primary Examiner* — Hanh N Nguyen
(74) *Attorney, Agent, or Firm* — Lee, Hong, Degerman, Kang & Waimey

(57) ABSTRACT

A method for reporting channel state for an unlicensed band in a wireless communication system, according to an embodiment of the present invention, is performed by a terminal, and may comprises the steps of: blind-detecting a reference signal in an unlicensed band cell (UCell) subframe according to the setting of a plurality of channel state reports; determining, according to the blind detection result, whether or not the UCell subframe is an available resource for the channel state reports; and if the UCell subframe is determined to be an available resource for the channel state reports, calculating a value for the channel state reports using the reference signal detected in the UCell subframe.

20 Claims, 12 Drawing Sheets

(58) Field of Classification Search
CPC . H04L 5/0035; H04L 5/0057; H04L 25/0224; H04L 5/0053; H04L 27/0006; H04J 11/005; H04B 7/024; H04W 72/0446; H04W 74/0808; H04W 72/042; H04W 72/0406; H04W 48/02; H04W 72/1278; H04W 72/1289

See application file for complete search history.

(56) References Cited

U.S. PATENT DOCUMENTS

| | | | |
|---|---|---|---|
| 10,014,911 B2* | 7/2018 | Marinier | H04B 7/024 |
| 2014/0036881 A1 | 2/2014 | Kim et al. | |
| 2014/0133425 A1 | 5/2014 | Kim et al. | |
| 2014/0247749 A1 | 9/2014 | Kim et al. | |
| 2014/0378157 A1 | 12/2014 | Wei et al. | |
| 2015/0009937 A1* | 1/2015 | Li | H04L 5/0053 370/329 |

OTHER PUBLICATIONS

Fujitsu, "DL data and CRS transmission for LAA", 3GPP TSG RAN WG1 Meeting #79, R1-144785, Nov. 2014, 8 pages.

* cited by examiner

METHOD FOR REPORTING CHANNEL STATE IN WIRELESS COMMUNICATION SYSTEM, AND APPARATUS THEREFOR

CROSS-REFERENCE TO RELATED APPLICATIONS

This application is the National Stage filing under 35 U.S.C. 371 of International Application No. PCT/KR2015/014193, filed on Dec. 23, 2015, which claims the benefit of U.S. Provisional Application No. 62/099,205, filed on Jan. 2, 2015, the contents of which are all hereby incorporated by reference herein in their entirety.

TECHNICAL FIELD

The present invention relates to a wireless communication system, and more particularly, to a method of reporting a channel state in a wireless communication system and an apparatus therefor.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE OF THE INVENTION

Technical Task

An object of the present invention is to provide a method of reporting a channel state in a wireless communication system and an operation related to the method.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method for a channel state report for an unlicensed band in a wireless communication system, the method being performed by a terminal includes performing blind detection on a reference signal in an unlicensed cell (UCell) subframe according to a plurality of channel state report configurations, determining whether or not the UCell subframe corresponds to a valid resource for the channel state report according to a result of the blind detection, and if the UCell subframe is determined as a valid resource for the channel state report, calculating a value for the channel state report using a reference signal detected in the UCell subframe.

Additionally or alternatively, if downlink control information (DCI) indicating UCell scheduling is received in the UCell subframe, the UCell subframe can be determined as a valid resource for the channel state report.

Additionally or alternatively, if downlink control information (DCI) triggering an aperiodic channel state report is received in the UCell subframe, the UCell subframe may be determined as a valid resource for the channel state report.

Additionally or alternatively, each of the plurality of channel state report configurations may indicate to report a channel state on at least one transmission point (TP), a TP set, or a subframe set.

Additionally or alternatively, if the terminal is configured to receive a downlink signal from a plurality of TPs via a UCell and all of a plurality of the TPs use the same physical cell identifier (ID), the method may further include receiving information indicating a TP or a TP set that transmits the reference signal in the UCell subframe.

Additionally or alternatively, the received information may indicate a TP or a TP set for which the UCell subframe is used as a valid resource for the channel state report.

Additionally or alternatively, if reference signals are detected in consecutive UCell subframes, the reference signals can be determined as being transmitted by the same TP.

Additionally or alternatively, if the terminal is configured to receive a downlink signal from a plurality of TPs via a UCell and a plurality of the TPs use different physical cell identifiers (IDs), the method may further include receiving information on a cell-specific reference signal which is linked to each of the plurality of channel state report configurations and performing blind detection on the cell-specific reference signal only, which is linked to each of the plurality of channel state report configurations, in the UCell subframe.

Additionally or alternatively, if the UCell subframe is determined as a valid resource for the channel state report, the UCell subframe can be used for reporting a channel state in the UCell subframe or a subframe after n subframes from the UCell subframe, where n is an integer equal to or greater than 1.

Additionally or alternatively, the method may further include receiving uplink resource allocation for the channel state report. In this case, the uplink resource allocation may be provided according to each TP or each channel state report configuration.

To further achieve these and other advantages and in accordance with the purpose of the present invention, according to a different embodiment, a terminal configured to perform channel state reporting for an unlicensed band in a wireless communication system includes an RF (radio frequency) unit, and a processor controls the RF unit, the processor performs blind detection on a reference signal in an unlicensed cell (UCell) subframe according to a plurality of channel state report configurations, determines whether or not the UCell subframe corresponds to a valid resource for the channel state report according to a result of the blind detection, if the UCell subframe is determined as a valid resource for the channel state report, calculates a value for the channel state report using a reference signal detected in the UCell subframe.

Additionally or alternatively, if downlink control information (DCI) indicating UCell scheduling is received in the UCell subframe, the UCell subframe can be determined as a valid resource for the channel state report.

Additionally or alternatively, if downlink control information (DCI) triggering an aperiodic channel state report is received in the UCell subframe, the UCell subframe may be determined as a valid resource for the channel state report.

Additionally or alternatively, each of the plurality of channel state report configurations can indicate to report a channel state on at least one transmission point (TP), a TP set, or a subframe set.

Additionally or alternatively, if the terminal is configured to receive a downlink signal from a plurality of TPs via a UCell and all of a plurality of the TPs use the same physical cell identifier (ID), the processor may receive information indicating a TP or a TP set that transmits the reference signal in the UCell subframe.

Additionally or alternatively, the received information can indicate a TP or a TP set for which the UCell subframe is used as a valid resource for the channel state report.

Additionally or alternatively, if reference signals are detected in consecutive UCell subframes, the reference signals may be determined as being transmitted by the same TP.

Additionally or alternatively, if the terminal is configured to receive a downlink signal from a plurality of TPs via a UCell and a plurality of the TPs use different physical cell identifiers (IDs), the processor may receive information on a cell-specific reference signal which is linked to each of the plurality of channel state report configurations and perform blind detection on the cell-specific reference signal only, which is linked to each of the plurality of channel state report configurations, in the UCell subframe.

Additionally or alternatively, if the UCell subframe is determined as a valid resource for the channel state report, the UCell subframe can be used for reporting a channel state in the UCell subframe or a subframe after n subframes from the UCell subframe, where n is an integer equal to or greater than 1.

Additionally or alternatively, the processor may receive uplink resource allocation for the channel state report. In this case, the uplink resource allocation can be provided according to each TP or each channel state report configuration.

Technical solutions obtainable from the present invention are non-limited the above-mentioned technical solutions. And, other unmentioned technical solutions can be clearly understood from the following description by those having ordinary skill in the technical field to which the present invention pertains.

Advantageous Effects

According to one embodiment of the present invention, it is able to efficiently report a channel state in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Figure 1:
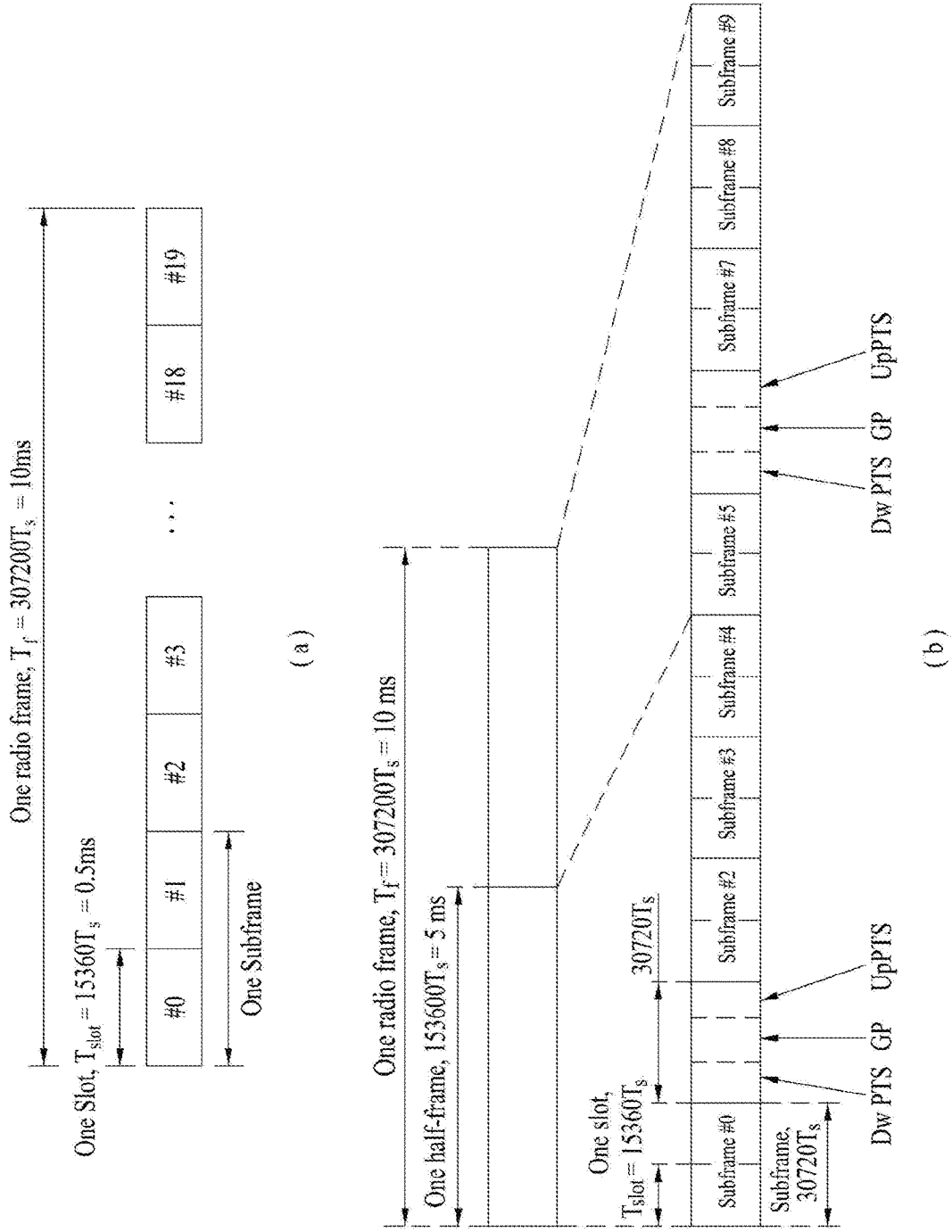
FIG. 1 is a diagram for an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link.

At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
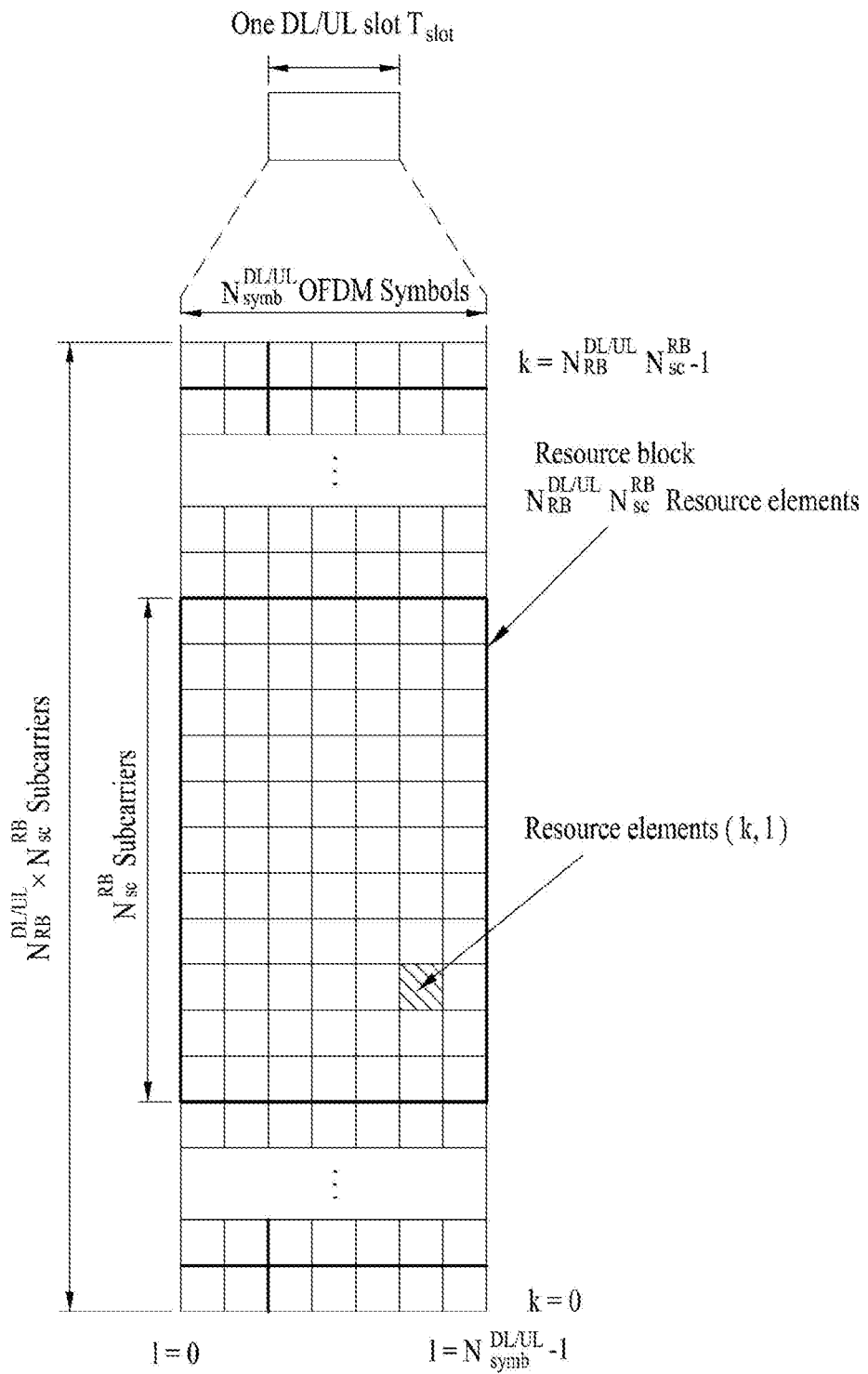
FIG. 2 is a diagram for an example of a downlink (DL)/uplink (UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
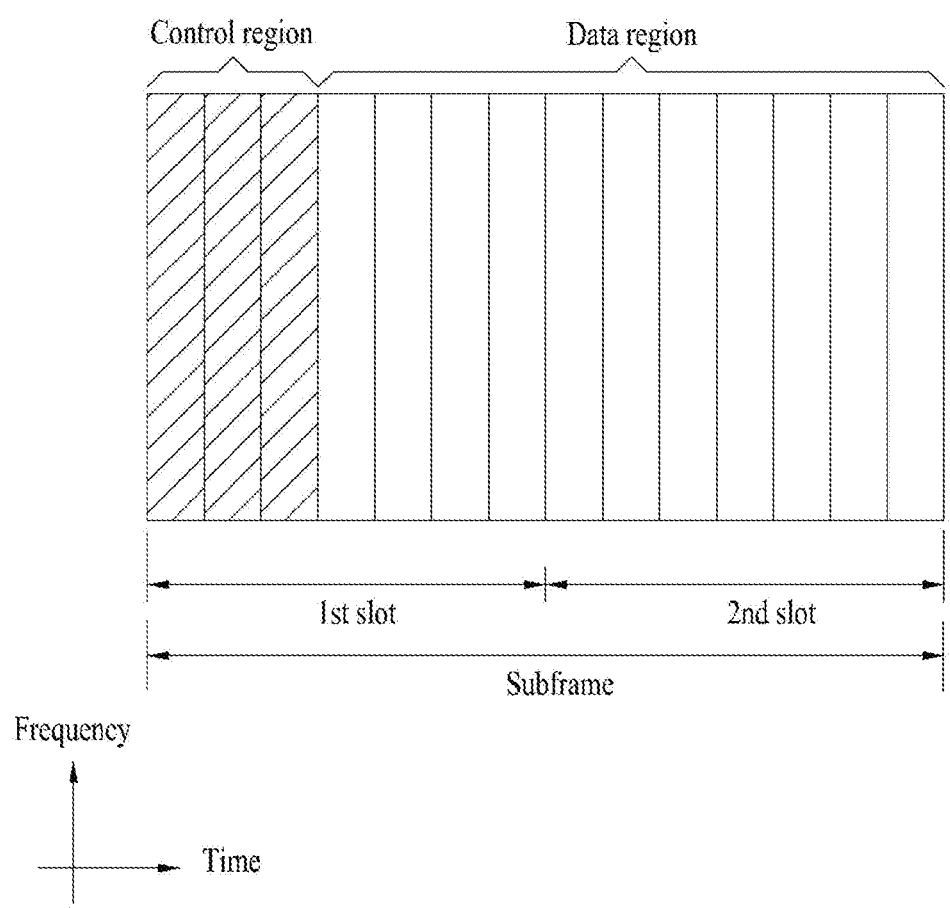
FIG. 3 is a diagram for an example of a downlink (DL) subframe structure used in 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
|---|---|---|---|
| Type | Aggregation Level L | Size [in CCEs] | PDCCH candidates $M^{(L)}$ |
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
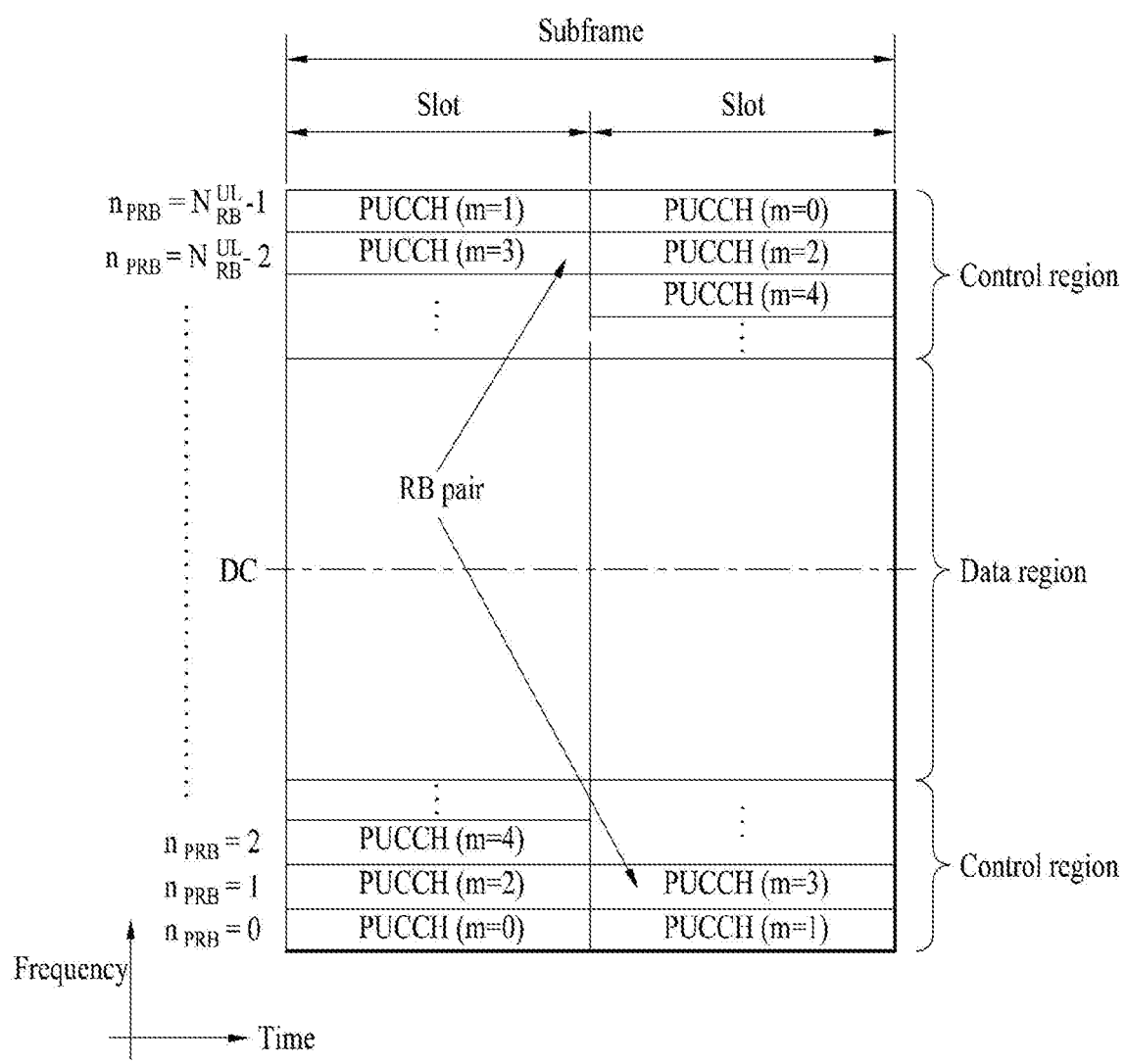
FIG. 4 is a diagram for an example of an uplink (UL) subframe structure used in 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI) | | | Mode 1-2 RI 1st wideband CQI(4bit) 2nd wideband CQI(4bit) if RI > 1 N*Subband PMI(4bit) (N is the total # of subbands) (if 8Tx Ant, N*subband W2 + wideband W1) |
| | UE selected (Subband CQI) | Mode 2-0 RI (only for Open-loop SM) 1st wideband CQI(4bit) + Best-M CQI(2bit) (Best-M CQI: An average CQI for M SBs selected from among N SBs) Best-M index (L bit) | | Mode 2-2 RI 1st wideband CQI(4bit) + Best-M CQI(2bit) 2nd wideband CQI(4bit) + Best-M CQI(2bit) if RI > 1 Best-M index (L bit) Wideband PMI(4bit) + est-M PMI(4bit) (if 8Tx Ant, wideband W2 + Best-M W2 + wideband W1) |
| | Higher Layer-configured (Subband CQI) | Mode 3-0 RI (only for Open-loop SM) 1st wideband CQI(4bit) + N*subbandCQI(2bit) | Mode 3-1 RI 1st wideband CQI(4bit) + N*subbandCQI(2bit) 2nd wideband CQI(4bit) + N*subbandCQI(2bit) if RI > 1 Wideband PMI(4bit) (if 8Tx Ant, wideband W2 + wideband W1) | Mode 3-2 RI 1st wideband CQI(4bit) + N*subbandCQI(2bit) 2nd wideband CQI(4bit) + N*subbandCQI(2bit) if RI > 1 N*Subband PMI(4bit) (N is the total # of subbands) (if 8Tx Ant, N*subband W2 + wideband W1 |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

|  |  | PMI feedback type | |
|---|---|---|---|
|  |  | No PMI | Single PMI |
| PUCCH CQI feedback type | Wideband (wideband CQI) | Mode 1-0 | Mode 1-1 |
|  | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

Currently, the LTE standard uses the 2-bit CSI request field in DCI format 0 or 4 to operate aperiodic CSI feedback when considering a carrier aggregation (CA) environment. When the UE is configured with several serving cells in the CA environment, the CSI request field is interpreted as two bits. If one of the TMs 1 through 9 is set for all CCs (Component Carriers), aperiodic CSI feedback is triggered according to the values in Table 8 below, and TM 10 for at least one of the CCs If set, aperiodic CSI feedback is triggered according to the values in Table 9 below.

TABLE 8

| A value of CSI request field | Description |
|---|---|
| '00' | No aperiodic CSI report is triggered |
| '01' | Aperiodic CSI report is triggered for a serving cell |
| '10' | Aperiodic CSI report is triggered for a first group of serving cells configured by a higher layer |
| '11' | Aperiodic CSI report is triggered for a second group of serving cells configured by a higher layer |

TABLE 9

| A value of CSI request field | Description |
| --- | --- |
| '00' | No aperiodic CSI report is triggered |
| '01' | Aperiodic CSI report is triggered for a CSI process group configured by a higher layer for a serving cell |
| '10' | Aperiodic CSI report is triggered for a first group of CSI processes configured by a higher layer |
| '11' | Aperiodic CSI report is triggered for a second group of CSI processes configured by a higher layer |

Carrier Aggregation (CA)

Figure 5:
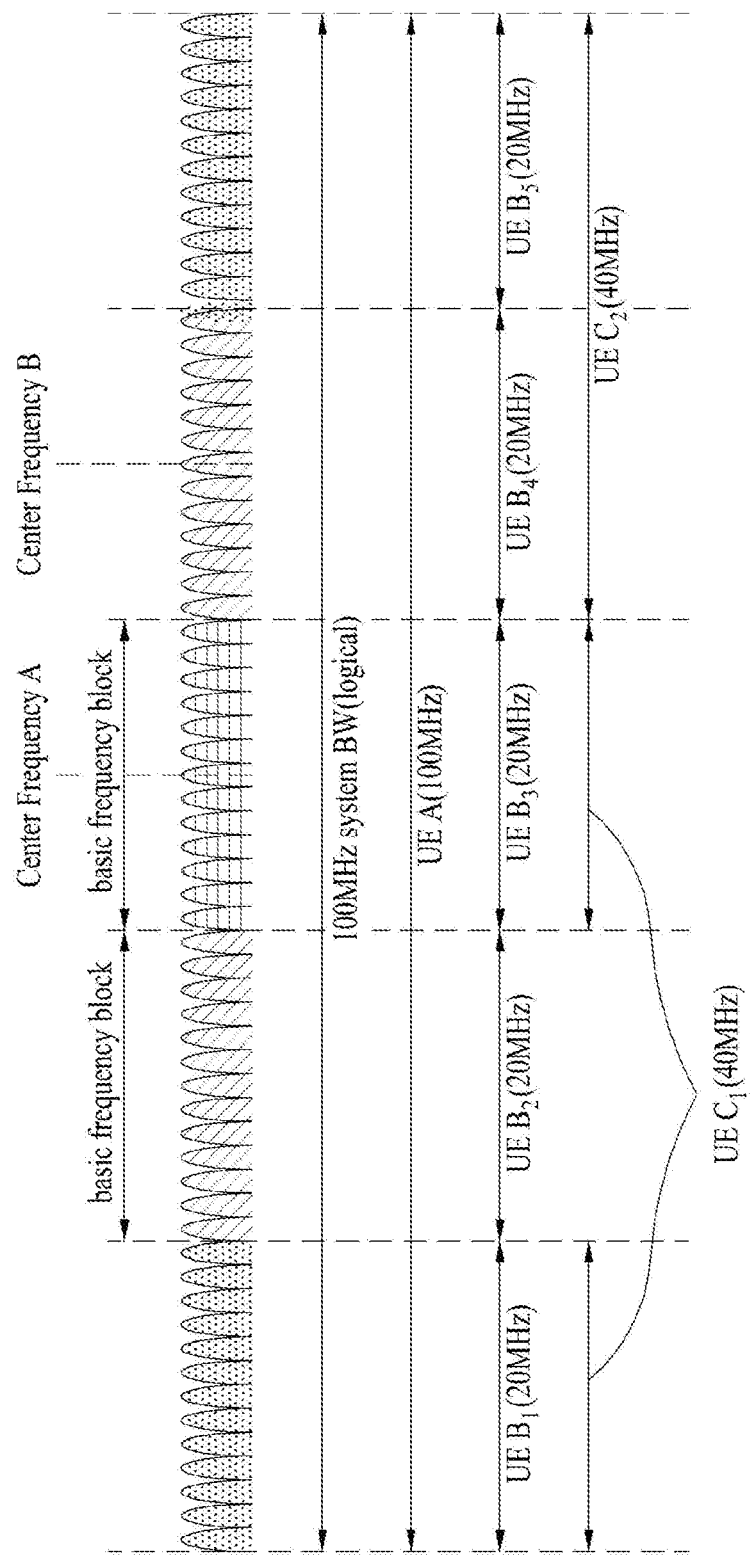
FIG. 5 is a diagram for a carrier used in 3GPP LTE/LTE-A system.

Carrier aggregation will hereinafter be described in detail. FIG. 5 is a conceptual diagram illustrating carrier aggregation (CA).

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 5, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 5, this is only exemplary and the CCs may have different bandwidths. Although the CCs are shown as being contiguous in the frequency domain in FIG. 5, FIG. 5 merely shows the logical concept and thus the CCs may be physically contiguous or separated.

Different center frequencies may be used for the CCs or one common center frequency may be used for physically contiguous CCs. For example, in FIG. 5, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs B1 to B5 may only use a bandwidth of 20 MHz and perform communication using one CC. Each of UEs C1 and C2 may use a bandwidth of 40 MHz and perform communication using two CCs. The two CCs may be contiguous or non-contiguous. The UE C1 uses two non-contiguous CCs and the UE C2 uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 6:
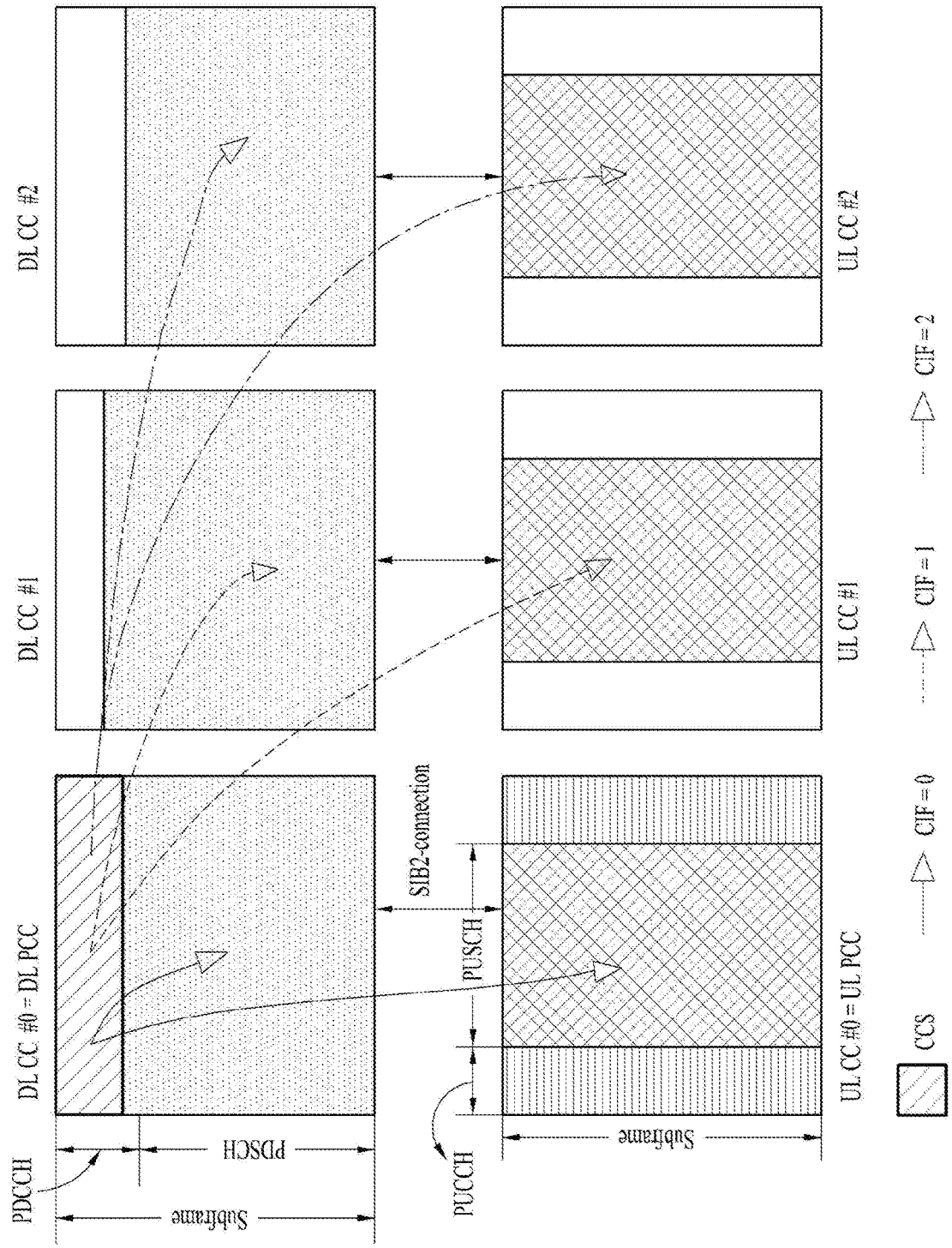
FIG. 6 is a diagram for cross scheduling used in 3GPP LTE/LTE-A system.

FIG. 6 is a conceptual diagram of a cross carrier scheduling scheme. Specifically, as can be seen from FIG. 6, the number of cells (or CCs) allocated to a relay node (RN) is set to 3, cross carrier scheduling is carried out using a CIF as described above. In this case, it is assumed that a downlink cell (or CC) #0 and a uplink cell (or CC) #0 is set to a primary downlink CC (i.e., a primary cell PCell) and a primary uplink downlink CC, and the remaining CCs are used as secondary cells (SCells).

Figure 7:
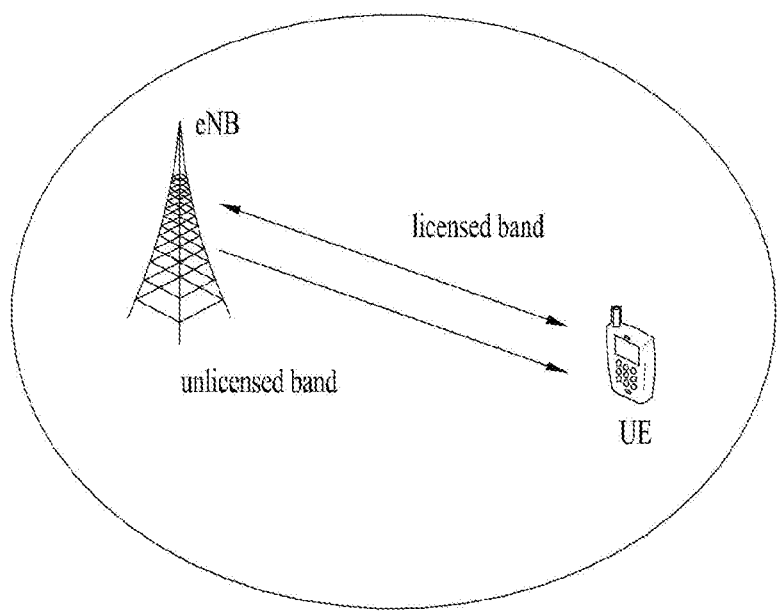
FIG. 7 is a diagram for a system in which a component carrier on a licensed band and a component carrier on an unlicensed band are combined.

As shown in FIG. 7, when carrier aggregation is performed on LTE-A band corresponding to a licensed band and an unlicensed band, it may consider an LAA (licensed-assisted access) scheme that an eNB transmits a signal to a UE or the UE transmits a signal to the eNB. In the following, for clarity of explanation of the proposed scheme, assume that a UE is configured to perform wireless communication via two component carriers in a licensed band and an unlicensed band, respectively. In this case, as an example, a carrier of the licensed band can be referred to as a primary component carrier (PCC or PCell) and a carrier of the unlicensed band can be referred to as a unlicensed secondary component carrier (USCC or UScell). Yet, schemes proposed in the present invention can be extensively applied to a case that a plurality of licensed bands and a plurality of unlicensed bands are used via a carrier aggregation scheme. And, the schemes can also be applied to a case that a signal is transceived between an eNB and a UE using an unlicensed band only. And, the schemes proposed by the present invention can be applied not only to 3GPP LTE system but also to a system having a different characteristic.

In a next generation system, in order to efficiently use a frequency band, discussion on a method of utilizing an unlicensed band such as 2.4 GHz band mainly used by WiFi system or a newly rising unlicensed band such as 5 GHz band for traffic offloading is in progress. Unlike a basic licensed band, since an unlicensed band basically assumes a scheme of having wireless transmission and reception opportunity via contention between communication nodes, it is required for each communication node to perform such a work as channel sensing before a signal is transmitted to check whether or not a signal is transmitted to a different communication node. For clarity, the above-mentioned operation is referred to as LBT (listen before talk). In particular, the operation of checking whether or not a different node transmits a signal is defined as CS (carrier sensing) and a case of determining that the different node does not transmit a signal is defined as CCA (clear channel assessment) is checked. In LTE system, it is necessary for an eNB or a UE to perform the LBT to transmit a signal on an unlicensed band (for clarity, LTE-U band). When the eNB or the UE transmits a signal in the LTE system, it is necessary for other communication nodes such as Wi-Fi to perform the LBT not to cause any interference. For example, a CCA threshold is regulated by −62 dBm for a non-WiFi signal and −82 dBm for a WiFi signal, respectively, in WiFi standard (802.11ac). For example, if a signal other than WiFi signal is received with power equal to or greater than −62 dBm, an STA or an AP does not transmit a signal in order not to cause any interference.

In the LAA system, an eNB checks whether a current channel state of an UCell is busy or idle. If it is determined as idle, the eNB transmits a scheduling grant via (E)PDCCH of a Pcell (i.e., cross carrier scheduling (CCS)) or (E)PD-CCH of the UCell to attempt to transmit and receive data. In this case, the eNB can transmit the data by forming a transmission burst during a time period consisting of N number of consecutive SFs (subframes).

Figure 8:
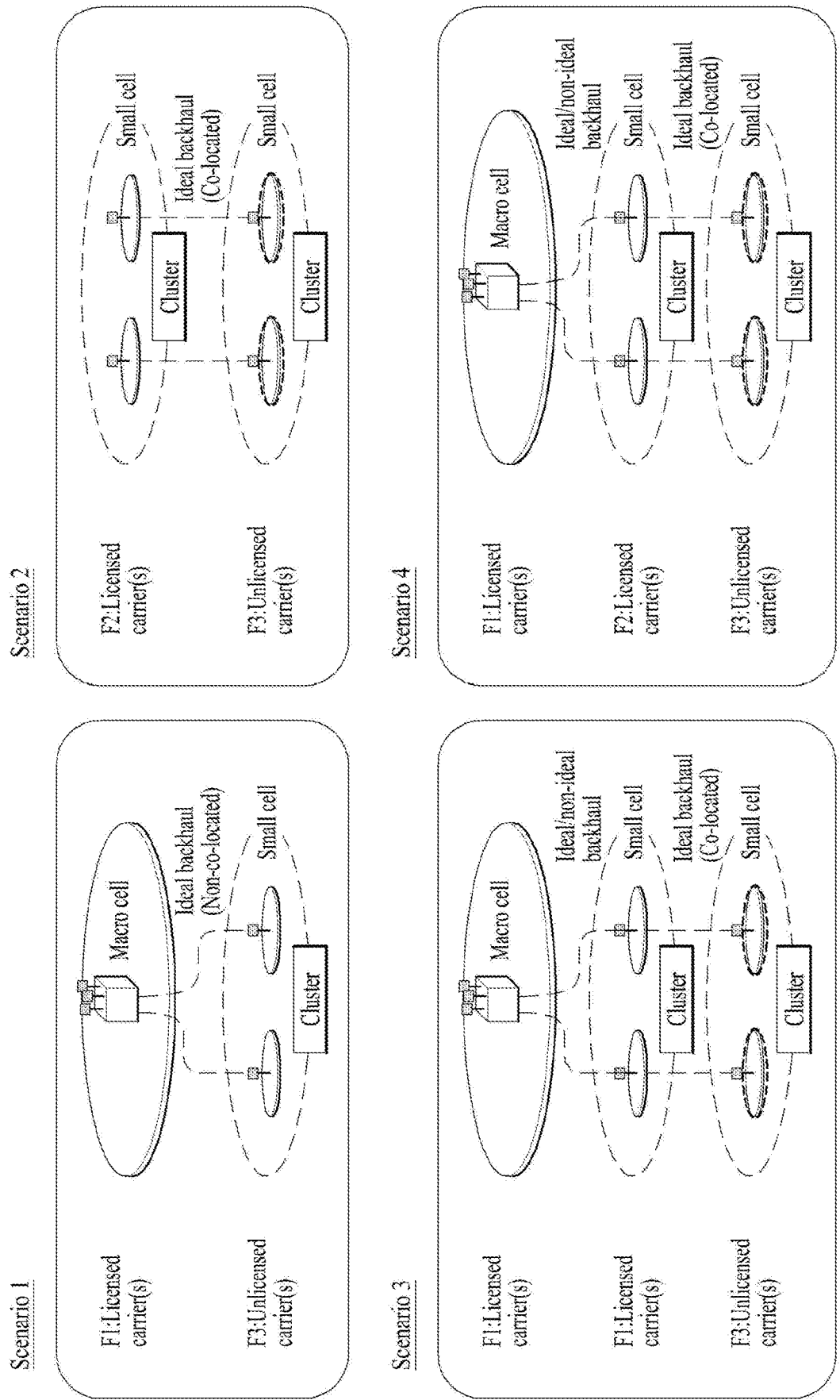
FIG. 8 is a diagram for scenarios capable of being installed in an LAA system.

FIG. 8 is a diagram for scenarios capable of being installed in an LAA system. In the present specification, a case that transmission nodes belonging to a cluster shown in FIG. 8 are connected with each other via an ideal backhaul and LAA small cells form a CoMP (coordinated multiple transmission and reception point) cluster is mainly explained.

Figure 9:
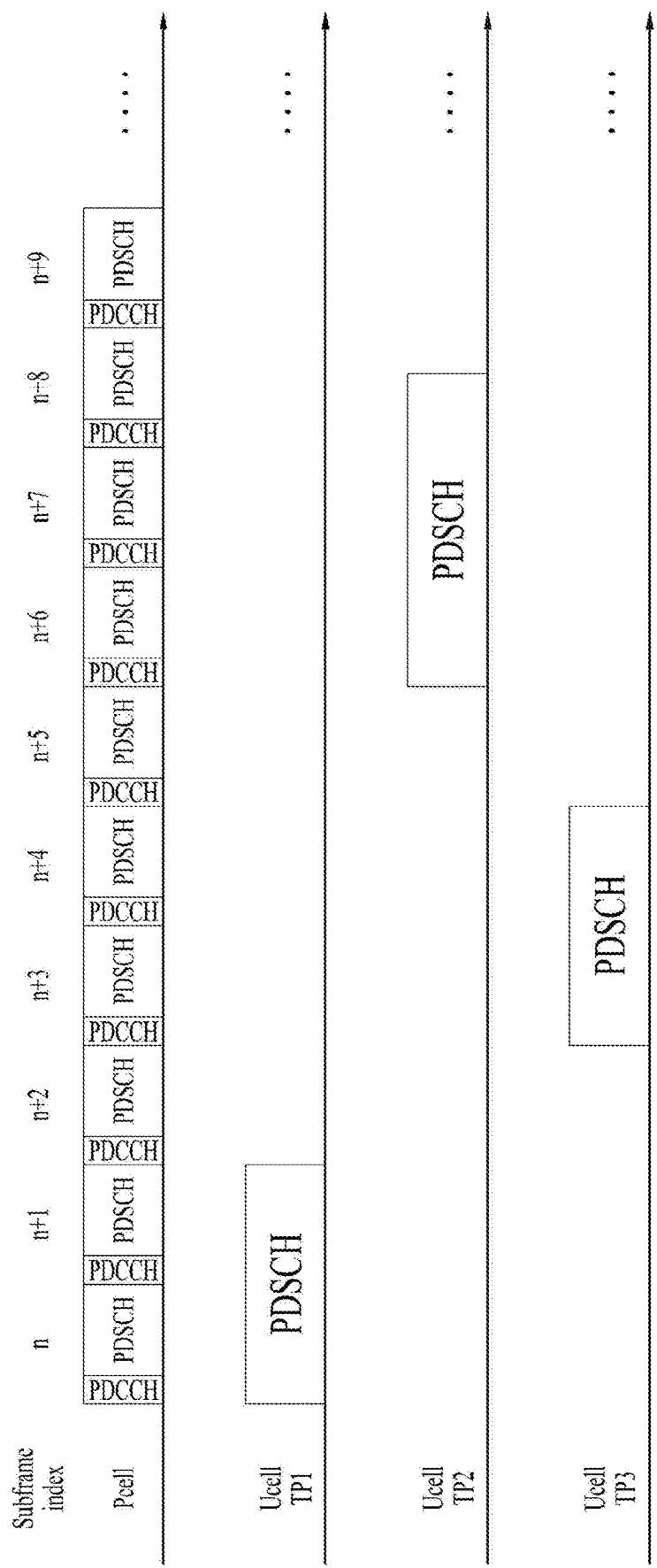
FIG. 9 is a diagram for a transmission scheme of CoMP operation.
Figure 10:
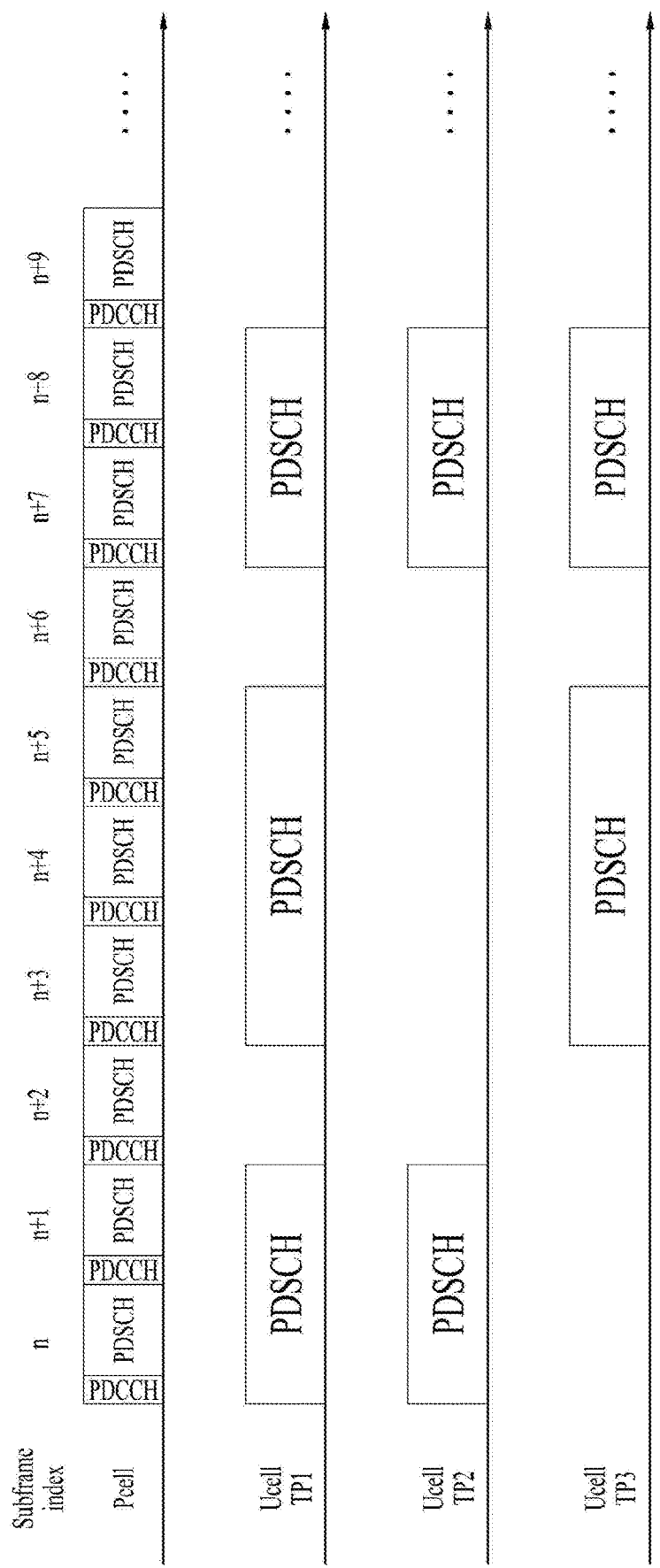
FIG. 10 is a diagram for a transmission scheme of CoMP operation.
Figure 11:
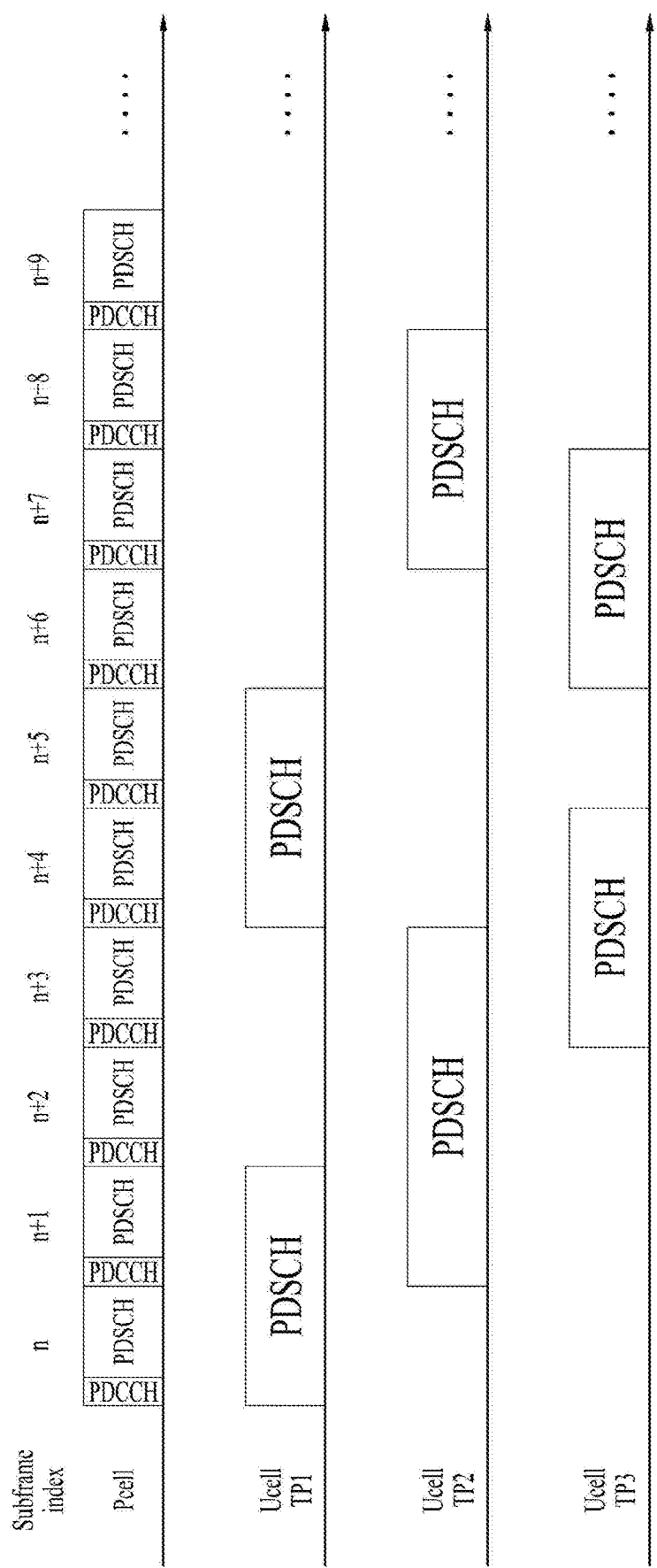
FIG. 11 is a diagram for a transmission scheme of CoMP operation.

The proposed schemes can be classified into a scheme that a single TP among TPs belonging to the CoMP cluster transmits a signal at a time (single TP transmission scheme) and a scheme that multiple TPs transmit a signal at the same time (multiple TP transmission scheme). FIG. 9 shows a single TP transmission scheme when 3 UCell TPs exist in the CoMP cluster. On the contrary, FIGS. 10 and 11 show examples of a multiple TP transmission scheme. FIG. 10 shows a case that the start and the end of transmission bursts of TPs belonging to the CoMP cluster are aligned. FIG. 11 shows a case that the start and the end of a transmission burst of each TP is not restricted between TPs.

When TPs belonging to the CoMP cluster are installed within a sensing distance, if a specific TP transmits a signal, since other TPs are unable to satisfy an idle channel condition of CCA, the TPs are unable to transmit a signal. Hence, the TPs use the single TP transmission scheme. In particular, according to the single TP transmission scheme, a central unit of the CoMP cluster controls a single TP to transmit a signal only among UCell TPs on the same frequency. Unlikely, if the TPs belonging to the CoMP cluster are installed in a manner of being apart from each other more than the sensing distance, it may use the multiple TP transmission scheme.

According to the single TP transmission scheme, a central unit informs all TPs of information on data to be transmitted and scheduling information in accordance with each TP in advance and each TP generates a transmission signal in advance. Subsequently, the central unit collects a CCA result from TPs at an SF boundary and selects a TP of which a channel is idle and CSI is good from the TPs to trigger transmission. Or, the central unit selects a TP based on CSI reported by a UE, a previous CCA result history of each TP, a CCA idle probability, and the like and prepares the selected TP for transmission. The selected TP performs CCA at an SF boundary to check whether or not a channel is idle. If it is determined as the channel is idle, the TP transmits data.

And, the proposed schemes can be classified into a scheme that LAA small cells belonging to the CoMP cluster use the same physical cell ID (same cell ID scheme) and a scheme that the cells belonging to the CoMP cluster use a different physical cell ID (different cell ID scheme). The scheme that UCell TPs belonging to the CoMP cluster use the same physical cell ID has a merit in that it is not necessary to reconfigure a serving UCell when an optimized serving UCell TP is changed due to a movement of a UE. In particular, it is able to reduce an impact of a service delay due to a handover operated by a small cell. According to the same cell ID scheme, a CRS transmitted from each TP uses the same sequence. Consequently, a UE is unable to determine a TP from which a signal is transmitted using the received CRS only.

And, the proposed schemes can be classified into a scheme that a resource capable of measuring CSI is designated by DCI transmitted via (E)PDCCH (explicit signaling scheme) and a scheme that the resource is determined by blind detection (BD) for checking whether or not a specific signal is transmitted in UCell (BD scheme). The resource capable of measuring CSI is restricted to a valid DL SF or a valid special SF. A condition for becoming the valid DL SF or the valid special SF is determined based on whether or not a DL signal is transmitted to the SF in a serving TP. In particular, if a signal is transmitted in DL in an SF, the SF is defined as the valid DL/special SF. In this case, the special SF corresponds to an SF in which a DL signal is transmitted in a partial area only of the SF.

An SF can be referred to as a DL SF or a special SF only when a DL signal is practically transmitted in UCell. Or, all SFs in which a DL signal is to be transmitted in UCell can be referred to as a DL/special SF. Among the SFs, if a DL signal is practically transmitted in an SF, the SF can be referred to as on-SF. If no DL signal is transmitted in an SF, the SF can be referred to as off-SF. In this case, only a DL/special on-SF is defined as a condition for becoming the valid DL/special SF. In particular, a resource capable of measuring CSI can be restricted to an SF set consisting of DL or special on-SFs.

According to the explicit signaling scheme, it may be able to notify one of information described in the following via (E)PDCCH of a Pcell or an UCell.

Information on whether or not an SF of UCell corresponds to a DL/special on-SF

Information on whether or not an SF of UCell corresponds to a valid DL/special SF for measuring CSI The information is transmitted in every SF or a periodically designated SF and can be applied to a current SF or a following SF.

According to the BD scheme, a UE performs blind decoding on an SF to check whether or not a DL signal is transmitted in an UCell. If the DL signal is detected, the UE determines the SF as on-SF or a valid DL/special SF. A DL signal on which blind detection is to be performed may vary depending on a transmission mode (TM) set to a UE. As a representative example, in case of a transmission mode performing CRS based demodulation, if an UCell CRS signal is transmitted in an SF, the SF is determined as a valid DL/special SF. Specifically, a valid DL/special SF condition for measuring CSI can be defined as follows according to a transmission mode of LTE system.

In case of an LTE system TM4: In order to determine CSI including CQI, a UE measures a signal using a received CRS and measures interference using a remaining signal obtained by eliminating a CRS from a CRS transmission resource. Hence, in case of the TM4, if a CRS signal is transmitted in an SF, the SF is determined as a valid DL/special SF.

In case of an LTE system TM9: In order to determine CSI including CQI, a UE measures a signal using a received CSI-RS and measures interference using a remaining signal obtained by eliminating a CRS from a CRS transmission resource. Hence, although the TM9 corresponds to a transmission mode performing DM-RS based demodulation, if a CRS is transmitted in an SF, the SF can be determined as a valid DL/special SF.

In case of an LTE system TM10: In order to determine CSI including CQI, a UE measures a signal using a received CSI-RS and measures interference using a signal received from a CSI-IM resource. Hence, in case of the TM10, if a CSI-RS signal is transmitted and/or a CSI-IM resource is protected in an SF, the SF is determined as a valid DL/special SF.

In case of the TM10, although a CRS is not transmitted in an SF and a CSI-RS is transmitted only in the SF, the SF can be determined as a valid DL/special SF. A UE tests whether or not a predetermined CSI-RS is transmitted in an SF using such a method as energy detection. If it is determined as the CSI-RS is transmitted in the SF, the SF can be determined as a valid DL/special SF.

It may be able to make a CSI-RS to be transmitted together in a CSI-IM configuration SF or a CSI-IM configuration OFDM symbol to determine whether or not CSI-IM is protected based on whether or not the CSI-RS is transmitted in the CSI-IM configuration SF or the CSI-IM configuration OFDM symbol. Or, it may be able to designate an NZP (non-zero power) CSI-RS to determine whether or not a CSI-IM resource is protected based on whether or not the NZP CSI-RS is transmitted. In order to estimate interference, it may use a protected CSI-IM resource only or a CSI-IM resource belonging to a valid DL/special SF only.

Meanwhile, it may be able to make a CRS to be transmitted together in an SF in which a CSI-RS is transmitted to determine whether or not the CSI-RS is transmitted in the SF based on whether or not the CRS is transmitted in the same SE And, it may be able to make a CRS to be transmitted together in a CSI-IM configuration SF to determine whether or not CSI-IM is protected based on whether or not the CRS is transmitted in the same SF. According to the scheme mentioned above, in case of TM10, if a CRS signal is transmitted in an SF, the SF can be determined as a valid DL/special SF or on-SF. It may be able to estimate CSI using a signal only which is received via a CSI-RS and a CSI-IM resource configured in the SF determined as the valid DL/special SF or the on-SF.

A UE checks whether or not a CRS or a CSI-RS is transmitted by performing detection on every SF to find out a TP from which the CRS is transmitted. The UE adopts a correlation between a transmission RS sequence and a reception signal. If the correlation exceeds a threshold, the UE determines it as an RS is transmitted from a corresponding TP. Yet, if UCell PDSCH scheduling is received in an SF, i.e., if UCell PDSCH scheduling DCI is received in an SF via (E)PDCCH, the SF is determined as on-SF, i.e., a valid DL/special SF, irrespective of a BD result. In this case, the UE receives a transmission interval and offset information at the time of receiving a CSI-RS, CSI-IM, and a ZP-CSI-RS configuration. For example, it may be able to configure the UE to transmit the CSI-RS, the CSI-IM, and the ZP-CSI-RS in every 5 SFs. In this case, signal estimation and interference estimation are configured to be performed using a CSI-RS and a CSI-IM resource belonging to a valid DL/special SF only. When a CSI-RS, CSI-IM, or a ZP-CSI-RS is configured in an SF, if the SF is determined as on-SF, the UE assumes that the CSI-RS, the CSI-IM, or the ZP-CSI-RS is transmitted all the time in the SF.

Unlikely, according to a scheme for determining whether or not a CSI-RS is transmitted in an SF and whether or not CSI-IM is configured in the SF based on whether or not a CRS is transmitted in the same SF, although CRS transmission is not detected in the SF in which the CSI-RS is transmitted and the CSI-IM is configured, if UCell PDSCH scheduling DCI is received in the SF via (E)PDCCH, it may be able to determine that corresponding PDSCH is transmitted in a manner of being mapped to a CSI-RS transmission resource, a CSI-IM configuration resource, and a ZP-CSI-RS resource. Meanwhile, when UCell PDSCH scheduling DCI is received via (E)PDCCH, if a CRS is detected in a corresponding SF, corresponding PDSCH is transmitted without being mapped to the CSI-RS transmission resource, the CSI-IM configuration resource, and the ZP-CSI-RS resource. In this case, a UE does not receive a transmission interval and offset information at the time of receiving a CSI-RS, CSI-IM, and a ZP-CSI-RS configuration. The UE assumes that the CSI-RS, the CSI-IM, or the ZP-CSI-RS is transmitted in an SF in which a CRS is transmitted only.

According to the proposed scheme, in case of periodic CSI reporting, a recent valid DL/special SF is designated as a CSI reference resource from among $(n-x)^{th}$ SF and SFs appearing prior to the $(n-x)^{th}$ SF for CSI reported in an $n^{th}$ SF. In case of aperiodic CSI reporting, a recent valid DL/special SF is designated as a CSI reference resource from among $(n-x)^{th}$ SF and SFs appearing prior to the $(n-x)^{th}$ SF for CSI reported in an $n^{th}$ SF. Or, a recent valid DL/special SF is designated as a CSI reference resource from among an SF in which aperiodic CSI triggering DCI is transmitted and SFs appearing prior to the SF. Or, an SF in which aperiodic CSI triggering DCI is transmitted is designated as a CSI reference resource. In this case, the SF in which the aperiodic CSI triggering DCI is transmitted is determined as a valid DL/special SF, i.e., DL/special on-SF, irrespective of a BD result.

In the following, operations of CoMP schemes in LAA system, which are generated by the combination of the aforementioned proposed schemes, are explained in detail.

Single TP Transmission Scheme, Same Cell ID Scheme

According to the proposed scheme, while UCell TPs belonging to a CoMP cluster use the same physical cell ID, only a single TP transmits a signal at a time. In order to measure and report CSI according to a TP, a plurality of CSI processes are set to a UE and each of a plurality of the processes designates a TP transmitting a signal to report CSI. As a variation of the proposed scheme, a DL/special on-SF is divided into a plurality of SF sets and it may inform a UE of an SF set to which an SF belongs thereto among a plurality of the SF sets. In this case, the UE reports CSI according to an SF set. In this case, a plurality of CSI processes are set to the UE for CSI reporting and an SF set is designated according to each CSI process. In the following description, terminologies described in the following can be interchangeably used as the same meaning.

CSI per transmission TP
CSI per CSI process
CSI per SF set

According to the proposed scheme, an eNB may inform a UE of information on a TP from which a DL signal is transmitted in an SF, i.e., information on whether or not the SF corresponds to on-SF in the aspect of a TP, or information on an SF set to which an SF belongs thereto. Or, the UE may find out the information. To this end, it may use methods described in the following. If a transmission burst is maintained during a fixed x SF, information on a start SF of the Tx burst can be provided only.

It may be able to notify a TP, which has performed transmission in an SF of an UCell, using DCI which is transmitted via (E)PDCCH of a Pcell or the UCell. In this case, since the SF of the UCell plays a role in designating a DL/special on-SF in terms of a TP, if a transmission TP is not provided by the DCI, the SF of the UCell can be recognized as off-SF in terms of all TPs.

It may be able to notify an SF set to which an SF of an UCell belongs thereto using DCI which is transmitted via (E)PDCCH of a Pcell or the UCell. If the SF of the UCell corresponds to off-SF in terms of all TPs, it may be able to configure the SF not to belong to any SF set or may generate a separate SF set for the SF of the UCell. In this case, it may inform a UE of an index of the SF set.

It may be able to notify information on whether or not there is a change of a transmission TP compared to a previous DL on-SF or information on whether or not there is a change of an SF set to which an SF belongs using DCI which is transmitted via (E)PDCCH of a Pcell or the UCell. If a change occurs, it may inform the UE of the change by toggling bit information of an indicator.

As a representative example of a TP-specific signal transmitted to an UCell, there is a TP-specific preamble signal. If the TP-specific preamble signal is detected, a UE is able to know a transmission TP in an SF or an SF set to which the SF belongs thereto. The TP-specific preamble signal can be transmitted only in a start SF of a Tx burst consisting of x number of SFs.

A UE performs detection on every SF to check whether or not a CRS is transmitted. If CRSs are transmitted in consecutive SFs, the UE assumes that the CRSs are transmitted from the same TP. In order for an eNB to change the transmission TP, the eNB stops transmission in all TPs during at least 1 or more SFs.

In case of a DM-RS based TM, a UE may be able to determine a TP from which a CSI-RS is transmitted based on a sequence (virtual cell ID) of a detected CSI-RS. In this scheme, since the sequence of the CSI-RS is generated by a virtual cell ID rather than a physical cell ID, a different virtual cell ID can be provided to each TP to make a sequence of a CSI-RS to be different according to a TP. Or, a position of a CSI-RS transmission resource can be differentiated according to each TP. In particular, if a CSI-RS is transmitted in the same SF, an RE position in which the CSI-RS is transmitted is differentiated in the SF. A CSI-RS is set to a UE according to a TP or a CSI process to find out a transmission TP from which a CSI-RS is transmitted or an SF set to which an SF belongs thereto.

Information on SFs belonging to each SF set is set to the UE via RRC signaling. The UE performs detection on every SF to check whether or not a CRS is transmitted in each SF and determines whether or not an SF corresponds to on-SF.

In order to estimate a channel using a CRS, inter-SF interpolation is performed on SFs belonging to the same SF set only. Or, consecutive SFs belonging to the same SF set are referred to as a Tx burst. The inter-SF interpolation is performed in a single Tx burst only to estimate a channel using a CRS. Similarly, in order to measure a signal reception level and an interference level to estimate CSI, restricted measurement is performed on SFs belonging to the same SF set only. Or, the restricted measurement is performed in an SF belonging to a single Tx burst only.

QCL (Quasi co-located) described in the following is assumed for large-scale properties of a channel necessary for performing channel estimation. In this case, it may consider all or a part of delay spread, Doppler spread, Doppler shift, average gain, and average delay as large-scale properties of a radio channel. If QCL assumption is available between received signals or channels on which the received signals are went through, it indicates that large-scale properties are identical to each other between two channels. Hence, if two received signals are able to assume the QCL, larger-scale properties of a channel obtained from one signal can be applied when a channel of another signal is estimated.

A UE may be able to measure large-scale properties of a CRS according to an SF set. In particular, the UE is unable to assume QCL between CRSs transmitted from SFs belonging to a different SF set.

A UE may be able to estimate a CSI-RS using large-scale properties of a CRS of an SF set to which a CSI-RS transmitting SF belongs thereto. Or, the UE may be able to estimate a CSI-RS using large-scale properties of a CRS which is transmitted in SFs of a single Tx bursts to which a CSI-RS transmitting SF belongs thereto.

A UE may be able to estimate a DM-RS using large-scale properties of a CRS or a CSI-RS of an SF set to which a DM-RS transmitting SF belongs thereto. Or, the UE may be able to estimate a DM-RS using large-scale properties of a CRS or a CSI-RS which is transmitted in SFs of a single Tx bursts to which a DM-RS transmitting SF belongs thereto.

According to the proposed scheme, a UL resource capable of individually reporting CSI per a transmission TP or CSI per a CSI process is designated to a UE to periodically report CSI. In particular, in order to report CSI on the K number of transmission TPs, K numbers of CSI report resources are allocated to the UE. In order to report CSI on a $k^{th}$ transmission TP in an $n^{th}$ SF, a recent valid DL/special SF for the CSI is designated as a CSI reference resource from among $(n-k)^{th}$ SF or SFs appearing prior to the $(n-k)^{th}$ SF. In this case, in order for an SF to be a valid DL/special SF for a specific CSI, the SF should become on-SF in terms of a TP associated with the CSI.

According to the proposed scheme, in case of aperiodic CSI reporting, CSIs to be reported to an eNB can be determined using one of methods described in the following.

CSI to be reported can be designated in DCI that triggers CSI reporting. CSIs to be reported can be designated in advance according to a state of CSI triggering bits of DCI.

It may report CSI of an SF set to which an SF in which triggering DCI is transmitted belongs thereto. In this case, one CSI is reported only by CSI triggering. In this case, an SF in which aperiodic CSI triggering DCI is transmitted should be determined as a DL/special on-SF in terms of a specific TP.

When a CSI report is triggered in an $n^{th}$ SF, CSI of an SF set to which a recent valid DL/special SF belongs is reported among $(n-x)^{th}$ SF or SFs appearing prior to the $(n-x)^{th}$ SF.

Single TP Transmission Scheme, Different Cell ID Scheme

According to the proposed scheme, while UCell TPs belonging to a CoMP cluster use a different physical cell ID, only a single TP transmits a signal at a time. According to the proposed scheme, a UE receives CRS configuration information transmitted by each TP from an eNB in advance. In this case, the UE is able to estimate a TP from which a DL signal is transmitted based on a received CRS sequence. According to the proposed scheme, similar to the aforementioned scheme (single TP transmission, same cell ID scheme), in order to measure and report CSI according to a TP, a plurality of CSI processes are designated to the UE and each of a plurality of the processes designates a TP transmitting a signal to report CSI. Or, each of a plurality of the processes designates a CRS to report CSI.

Or, it may be able to designate a signal, which is transmitted in an SF belonging to an SF set, on which CSI is to be measured and reported according to each CSI process. In this case, a CRS can be designated in advance according to an SF set in which the CRS is transmitted.

According to the proposed scheme, an eNB may inform a UE of information on a TP from which a DL signal is transmitted in an SF, i.e., information on whether or not the SF corresponds to on-SF in the aspect of a TP or information on a CSI SF set to which an SF belongs thereto. Or, the UE may find out the information. To this end, it may use the aforementioned scheme (single TP transmission, same cell ID scheme) or methods described in the following.

The UE performs detection on every SF to check information on whether or not each TP transmits a CRS according to a CRS sequence per each TP and a CRS configuration to determine a TP from which a CRS is transmitted. The UE adopts correlation between a CRS sequence transmitted according to a TP and a reception signal and selects a TP having a greatest correlation value. If the correlation value exceeds a predetermined threshold, the UE determines that the TP has transmitted the CRS. In the present scheme, in order to reduce complexity of the operation of calculating correlation between a plurality of candidate CRS sequences and reception signals, the number of candidate CRS sequences can be restricted in advance. Or, the UE can report not only UE capability but also the number of candidate CRS sequences on which blind detection is to be performed to an eNB. Or, the eNB may inform the UE of CRS information on a plurality of TPs and designate a CRS for which correlation is to be adopted via MAC signaling. In the present scheme, when a CSI process is designated to the UE, a CRS associated with the CSI process is designated to the UE. Hence, the UE can perform detection on CRSs associated with assigned CSI processes only. In this case, if reporting on a specific CSI process is disabled via MAC signaling, the UE does not perform the CSI reporting and detection on a CRS associated with the specific CSI process.

In case of a DM-RS based TM, when a CSI process is designated, it may be able to designate not only a CSI-RS for measuring a signal and CSI-IM for estimating interference but also a CRS connected with the CSI-RS and the CSI-IM. The UE determines that a CSI-RS is transmitted or CSI-IM is protected only when the CRS is transmitted in an SF by performing detection on the connected CRS. In particular, an SF may become a valid DL/special SF for a CSI process only when a CRS connected with the CSI process is transmitted.

Multiple TP Transmission Scheme, Same Cell ID Scheme

According to the proposed scheme, while UCell TPs belonging to a CoMP cluster use the same physical cell ID, a plurality of TPs transmit a signal at the same time. A scheme of transmitting a signal transmitted by a plurality of TPs can be classified depending on a case that the start and the end of a Tx burst of each TP is aligned (FIG. 10) or a case that the start and the end of a Tx burst of each TP is not aligned (FIG. 11). According to the proposed scheme, a plurality of TPs transmit the same CRSs, which are generated by the same physical cell ID, and the CRSs are received by a UE in a manner of being overlapped. In case of a PDSCH transmission mode of a CRS based demodulation scheme, similar to a CRS, a plurality of TPs transmit the same PDSCHs at the same time and the PDSCHs are received by the UE in a manner of being overlapped. In case of a PDSCH transmission mode of a DM-RS based demodulation scheme, each of TPs belonging to the CoMP cluster can transmit an independent PDSCH.

A plurality of CSI processes are designated to a UE for CSI reporting. In this case, each of a plurality of the CSI processes designates a TP set for transmitting a signal to report CSI. Or, each of a plurality of the CSI processes designates an SF set for measuring and reporting CSI. Or, a single CSI process is designated to the UE to make the UE report CSI which is measured in a recent valid DL/special SF. In this case, a condition for becoming the valid DL/special SF is to transmit a CRS to the SF by at least one specific TP.

According to the proposed scheme, an eNB may inform a UE of information on a TP set from which a DL signal is transmitted in an SF, i.e., information on whether or not the SF corresponds to on-SF in the aspect of a TP set or information on an SF set to which an SF belongs thereto. Or, the UE may find out the information. To this end, it may use methods described in the following.

It may be able to notify a TP set, which has performed transmission in an UCell SF, using DCI transmitted via (E)PDCCH of a Pcell or an UCell. Or, it may be able to notify an SF set to which the UCell SF belongs thereto.

It may be able to notify information on whether or not there is a change in a transmission TP set compared to a previous DL on-SF or information on whether or not there is a change in an SF set to which a UCell SF belongs using DCI transmitted via (E)PDCCH of a Pcell or UCell.

A UE performs detection on every SF to check whether or not a CRS is transmitted and assumes that CRSs transmitted from consecutive SFs are transmitted from the same TP set.

In case of a DM-RS based TM, a UE may be able to determine a TP set from which a CSI-RS signal is transmitted or an SF set to which an UCell SF belongs thereto. In particular, a CSI-RS for measuring a signal is designated according to a CSI process. If a CSI-RS is detected in a designated CSI-RS resource, a corresponding SF is determined as a valid DL/special SF for a corresponding CSI process.

According to the proposed scheme, in order to estimate a CRS channel, a UE can perform inter-SF interpolation on SFs belonging to the same SF set only. Or, in case of the aligned multiple TP transmission scheme, the UE can perform inter-SF interpolation on a single Tx burst only to estimate a CRS channel. In case of the non-aligned multiple TP transmission scheme, the UE performs intra-SF interpolation to estimate a CRS channel.

Multiple TP Transmission Scheme, Different Cell ID Scheme

According to the proposed scheme, while UCell TPs belonging to a CoMP cluster use a different physical cell ID, a plurality of TPs transmit a signal at the same time. A UE receives information on a plurality of CSI process configurations from an eNB to report information on CRS configurations transmitted by a plurality of the TPs and CSI.

In case of a CSI process of a CRS based TM, a UE can receive a CRS configuration for measuring CSI according to a CSI process. When a CRS, which is designated according to a CSI process, is transmitted in an SF, the SF becomes a valid DL/special SF for the CSI process.

In case of a CSI process of a DM-RS based TM, a UE can receive a CSI-RS and CSI-IM configuration according to a CSI process to measure CSI. When a CSI-RS, which is designated according to a CSI process, is transmitted and a designated CSI-IM is protected in an SF, the SF becomes a valid DL/special SF for the CSI process.

Or, a UE can receive CRS configuration information connected with the CSI-RS, which is designated according to a CSI-process, and CRS configuration information connected with the designated CSI-IM. When a CRS, which is connected according to a CSI process, is transmitted in an SF, the SF becomes a valid DL/special SF for the CSI process.

Or, a UE can receive a plurality of CRS configuration information connected with a CSI-RS, which is designated according to a CSI process, and a plurality of CRS configuration information connected with a designated CSI-IM. When all of a plurality of CRSs, which are connected according to a CSI process, are transmitted in an SF, the SF becomes a valid DL/special SF for the CSI process.

According to the proposed scheme, an eNB can inform a UE of information on a TP set from which a DL signal including a CRS is transmitted in an SF, i.e., information on whether or not the SF corresponds to on-SF in the aspect of the TP set. Or, the UE may find out the information via CRS detection.

Figure 12:
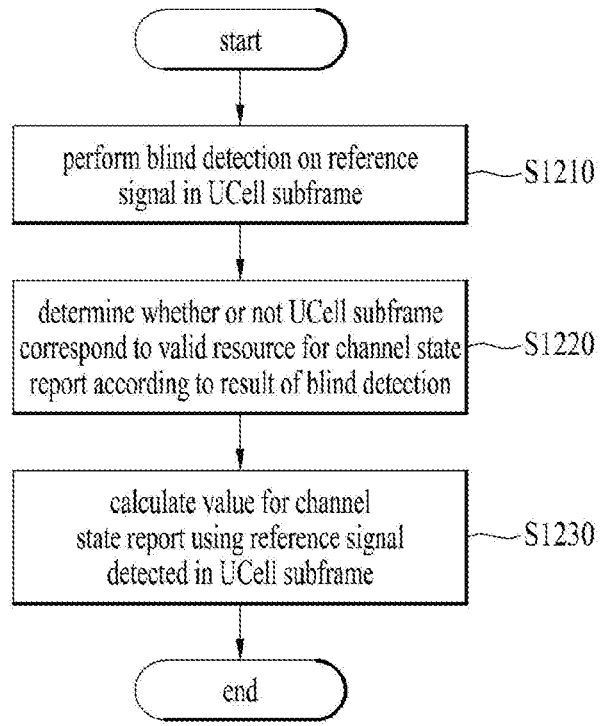
FIG. 12 is a flowchart for an operation according to one embodiment of the present invention.

FIG. 12 is a flowchart for an operation according to one embodiment of the present invention.

FIG. 12 shows a method for reporting a channel state for an unlicensed band in a wireless communication system.

A terminal 121 may perform blind detection on a reference signal in an UCell (unlicensed cell) subframe of according to a plurality of channel state report configurations [S1210]. The terminal may determine whether or not the UCell subframe corresponds to a valid resource for the channel state report according to a result of the blind detection [S1220]. Subsequently, if the UCell subframe is determined as a valid resource for the channel state report, the terminal may calculate a value for the channel state report using a reference signal detected in the UCell subframe.

If downlink control information (DCI) indicating UCell scheduling is received in the UCell subframe, the terminal may determine the UCell subframe as a valid resource for the channel state report.

If downlink control information (DCI) triggering an aperiodic channel state report is received in the UCell subframe, the terminal may determine the UCell subframe as a valid resource for the channel state report.

Each of a plurality of the channel state report configurations can indicate channel state reporting on at least one transmission point (TP), a TP set, or a subframe set.

If the terminal is configured to receive a downlink signal from a plurality of TPs via UCell and all of a plurality of the TPs use the same physical cell identifier (ID), the terminal may receive information on a TP or a TP set, which transmits the reference signal in the UCell subframe, from one of a plurality of the TPs or a serving base station. The received information can indicate a TP or a TP set for which the UCell subframe is used as a valid resource for reporting the channel state.

Moreover, if reference signals are detected from consecutive UCell subframes, the terminal may determine them as the detected reference signals are transmitted by the same TP.

If the terminal is configured to receive a downlink signal from a plurality of TPs via UCell and a plurality of the TPs use different physical cell identifiers (IDs), the terminal may receive information on a cell-specific reference signal linked to each of the plurality of channel state report configurations from one of a plurality of the TPs or a serving base station. Subsequently, the terminal may perform blind detection on the cell-specific reference signal, which is linked to each of the plurality of the channel state report configurations, in the UCell subframe.

The UCell subframe, which is determined as a valid resource for the channel state report, may be used for reporting a channel state in the UCell subframe or a subframe after n subframes from the UCell subframe, where n is an integer equal to greater than 1.

The terminal may receive uplink resource allocation for the channel state report from one of a plurality of the TPs or a serving base station and the uplink resource allocation may be provided according to a TP or a channel state report configuration.

In the foregoing description, the embodiments according to the present invention are briefly explained with reference to FIG. 12. The embodiments related to FIG. 12 can alternatively or additionally include at least a part of the aforementioned embodiment(s).

Examples for the proposed scheme can also be included as one of implementation methods of the present invention. Hence, it is apparently understandable that the examples are able to be considered as a sort of proposed scheme. The proposed schemes can be independently implemented or can be implemented in a combined (aggregated) form of a part of the proposed schemes. An eNB can inform a UE of information on whether or not the proposed methods are applied (or, information on rules of the proposed methods) via a predefined signaling (e.g., physical layer signaling or higher layer signaling).

Figure 13:
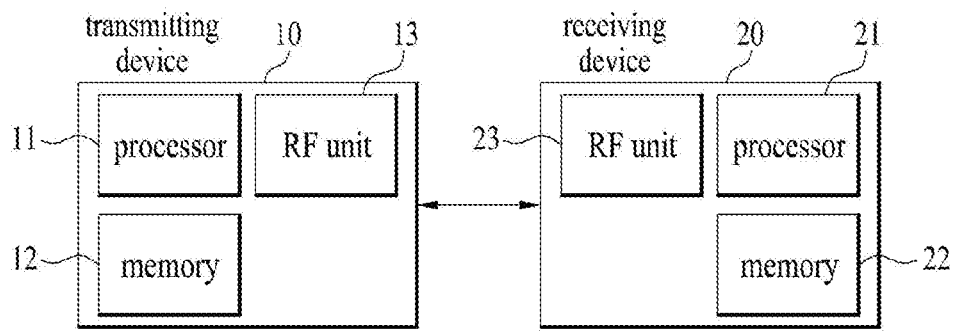
FIG. 13 is a block diagram for a device for implementing embodiment(s) of the present invention.

FIG. 13 is a block diagram of a transmitting device 10 and a receiving device 20 configured to implement exemplary embodiments of the present invention. Referring to FIG. 13, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device and/or the receiving device may be configured as a combination of one or more embodiments of the present invention.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to a wireless communication device such as a mobile terminal, relay, or base station.

What is claimed is:

1. A method for a terminal to perform a channel state report for an unlicensed band in a wireless communication system, the method comprising:
    performing blind detection on a reference signal in an unlicensed cell (UCell) subframe according to a plurality of channel state report configurations, wherein the UCell subframe is a subframe used by a UCell, wherein the UCell is a secondary cell operating on the unlicensed band together with a primary cell (PCell) operating on a licensed band;
    determining whether or not the UCell subframe corresponds to a valid resource for the channel state report, wherein the UCell subframe is determined as corresponding to the valid resource in case that the reference signal is detected on the UCell subframe according to a result of the blind detection;
    determining which transmission point (TP) among a plurality of TPs transmits the reference signal by comparing a predetermined value with a correlation value between the reference signal and a reference signal sequence; and
    estimating a channel state of the TP for the channel state report using the reference signal detected in the UCell subframe, in response to determining the UCell subframe as corresponding to the valid resource for the channel state report.

2. The method of claim 1, wherein the UCell subframe is determined as corresponding to the valid resource for the channel state report, in response to downlink control information (DCI) indicating UCell scheduling being received in the UCell subframe.

3. The method of claim 1, wherein the UCell subframe is determined as corresponding to the valid resource for the channel state report, in response to downlink control information (DCI) triggering an aperiodic channel state report being received in the UCell subframe.

4. The method of claim 1, wherein each of the plurality of channel state report configurations indicates to report the channel state on at least one TP, a TP set, or a subframe set.

5. The method of claim 1, further comprising:
    receiving, by the terminal, information indicating the TP or a TP set that transmits the reference signal in the UCell subframe, in response to the terminal being configured to receive a downlink signal from the plurality of TPs via a UCell and all of the plurality of TPs using a same physical cell identifier (ID).

6. The method of claim 5, wherein the received information indicates the TP or a TP set for which the UCell subframe is used as the valid resource for the channel state report.

7. The method of claim 1, wherein the reference signals are determined as being transmitted by a same TP, in response to reference signals being detected in consecutive UCell subframes.

8. The method of claim 1, wherein in response to the terminal being configured to receive a downlink signal from the plurality of TPs via a UCell and the plurality of TPs using different physical cell identifiers (IDs), the method further comprises:
- receiving information on a cell-specific reference signal which is linked to each of the plurality of channel state report configurations; and
- performing blind detection on only the cell-specific reference signal, which is linked to each of the plurality of the channel state report configurations, in the UCell subframe.

9. The method of claim 1, wherein the UCell subframe is used for reporting the channel state in the UCell subframe or a subframe after n subframes from the UCell subframe, where n is an integer equal to or greater than 1, in response to the UCell subframe being determined as corresponding to the valid resource for the channel state report.

10. The method of claim 1, further comprising:
- receiving uplink resource allocation for the channel state report,
- wherein the uplink resource allocation is provided according to each TP or each channel state report configuration.

11. A terminal configured to perform channel state reporting for an unlicensed band in a wireless communication system, the terminal comprising:
- an RF (radio frequency) unit; and
- a processor configured to control the RF unit,
- wherein the processor is configured to:
- perform blind detection on a reference signal in an unlicensed cell (UCell) subframe according to a plurality of channel state report configurations, wherein the UCell subframe is a subframe used by a UCell, wherein the UCell is a secondary cell operating on the unlicensed band together with a primary cell (PCell) operating on a licensed band,
- determine whether or not the UCell subframe corresponds to a valid resource for the channel state report, wherein the UCell subframe is determined as corresponding to the valid resource in case that the reference signal is detected on the UCell subframe according to a result of the blind detection,
- determine which transmission point (TP) among a plurality of TPs transmits the reference signal by comparing a predetermined value with a correlation value between the reference signal and a reference signal sequence, and
- estimate a channel state of the TP for the channel state report using the reference signal detected in the UCell subframe, in response to determining the UCell subframe as corresponding to the valid resource for the channel state report.

12. The terminal of claim 11, wherein the UCell subframe is determined as corresponding to the valid resource for the channel state report, in response to downlink control information (DCI) indicating UCell scheduling being received in the UCell subframe.

13. The terminal of claim 11, wherein the UCell subframe is determined as corresponding to the valid resource for the channel state report, in response to downlink control information (DCI) triggering an aperiodic channel state report being received in the UCell subframe.

14. The terminal of claim 11, wherein each of the plurality of channel state report configurations indicates to report the channel state on at least one TP, a TP set, or a subframe set.

15. The terminal of claim 11, wherein the processor is further configured to:
- receive information indicating the TP or a TP set that transmits the reference signal in the UCell subframe, in response to the terminal being configured to receive a downlink signal from the plurality of TPs via a UCell and all of the plurality of TPs using a same physical cell identifier (ID).

16. The terminal of claim 11, wherein the received information indicates the TP or a TP set for which the UCell subframe is used as the valid resource for the channel state report.

17. The terminal of claim 16, wherein the reference signals are determined as being transmitted by a same TP, in response to reference signals being detected in consecutive UCell subframes.

18. The terminal of claim 11, wherein in response to the terminal being configured to receive a downlink signal from the plurality of TPs via a UCell and the plurality of TPs using different physical cell identifiers (IDs), the processor is further configured to:
- receive information on a cell-specific reference signal which is linked to each of the plurality of channel state report configurations, and
- perform blind detection on only the cell-specific reference signal, which is linked to each of the plurality of channel state report configurations, in the UCell subframe.

19. The terminal of claim 11, wherein the UCell subframe is used for reporting the channel state in the UCell subframe or a subframe after n subframes from the UCell subframe, where n is an integer equal to or greater than 1, in response to the UCell subframe being determined as corresponding to the valid resource for the channel state report.

20. The terminal of claim 11, wherein the processor receives uplink resource allocation for the channel state report and wherein the uplink resource allocation is provided according to each TP or each channel state report configuration.

* * * * *